United States Patent [19]

Abens et al.

[11] Patent Number: 4,620,914

[45] Date of Patent: Nov. 4, 1986

[54] APPARATUS FOR PURIFYING HYDROGEN

[75] Inventors: Sandors G. Abens, Rye, N.Y.; Mohammad Farooque, Huntington, Conn.

[73] Assignee: Energy Research Corporation, Danbury, Conn.

[21] Appl. No.: 751,375

[22] Filed: Jul. 2, 1985

[51] Int. Cl.[4] ................................................ C25F 9/00
[52] U.S. Cl. ..................... 204/265; 204/266; 204/270; 204/277; 204/278; 204/130; 429/17
[58] Field of Search ............... 204/129, 130, 265, 266, 204/258, 270, 277, 278; 429/17

[56] References Cited

U.S. PATENT DOCUMENTS

| | | | |
|---|---|---|---|
| 1,284,618 | 11/1918 | Dow | 204/98 |
| 3,401,099 | 9/1968 | McEvoy | 204/129 |
| 3,410,783 | 11/1968 | Tomter | 204/129 |
| 3,446,674 | 5/1969 | Giner | 136/86 |
| 3,475,302 | 10/1969 | Langer et al. | 204/129 |
| 3,910,829 | 10/1975 | Eibl et al. | 204/149 |
| 4,024,036 | 5/1977 | Nakamura et al. | 204/129 |
| 4,182,795 | 1/1980 | Baker et al. | 429/13 |
| 4,263,112 | 4/1981 | Frosch et al. | 204/129 |

Primary Examiner—R. L. Andrews
Attorney, Agent, or Firm—John J. Torrente

[57] ABSTRACT

Purification of hydrogen is realized in an assembly comprising anode and cathode gas diffusion electrodes, an electrolyte situated between the electrodes, first and second gas passages adjacent the electrodes and means for applying a voltage across the electrodes.

13 Claims, 8 Drawing Figures

TABLE 1
GAS COMPOSITION, PERCENT
60% HYDROGEN RECOVERY

|  | FEED GAS | TAIL GAS | PRODUCT (DRY BASIS) |
|---|---|---|---|
| HYDROGEN | 69.4 | 47.6 | 99.81 |
| CARBON DIOXIDE | 23.1 | 39.6 | 0.19 |
| WATER | 7.5 | 12.8 |  |
| TOTAL | 100.0 | 100.0 | 100.0 |

APPARATUS FOR PURIFYING HYDROGEN

BACKGROUND OF THE INVENTION

This invention relates to an apparatus and method for purifying gases and, in particular, to an apparatus and method for purifying hydrogen gas.

Many present day industries utilize in their manufacturing processes hydrogen of over 99% purity. Chemical producers, food manufacturers, and electronics manufacturers, to name a few, require pure hydrogen for various purposes.

Most industrial processes for producing hydrogen provide the hydrogen in less than 75% concentration. Catalytic steam reforming of natural gas or light hydrocarbons, partial oxidation of heavy hydrocarbon stock and coal gasification all produce dilute hydrogen. Also, dilute hydrogen is often available as a by-product in several chemical industries.

To obtain pure hydrogen, small scale users generally employ a costly electrolytic process or purchase merchant hydrogen. Large scale users, on the other hand, use state-of-the-art purification techniques such as scrubbing, cryogenic separation, pressure-swing adsorption, or membrane diffusion separators.

In the conventional electrolytic type of processing, hydrogen contained in water is converted to gaseous hydrogen by oxidizing water in an electrochemical cell. In another electrolytic process, the hydrogen contained in a gaseous mixture is transformed into ionic form in contact with a palladium membrane. The ionic hydrogen at the surface of the membrane is converted to atomic hydrogen and the atomic hydrogen then passes through the membrane. At the output end, the atomic hydrogen is converted to molecular hydrogen and thereby pure hydrogen is produced.

The above method, however, is disadvantageous in that it is sensitive to temperature and impurities such as sulfur and hydrocarbon compounds. Also, the pressure of the hydrogen on the input side of the membrane must always be higher than that on the output side. The palladium based membranes are also prone to loss of stability after repeated cycles of adsorption and desorption.

U.S. Pat. No. 3,446,674 to Giner discloses an electrochemical converter which likewise relies on atomic hydrogen being generated and being passed through a palladium membrane. More specifically, Giner discloses a converter which employs an anode which is provided with a dehydrogenation catalyst. The cathode member is a palladium membrane permeable to hydrogen. An electrolyte is disposed between the anode and cathode and a power supply is connected to the anode and cathode to complete the circuit.

In operation of this converter, a gaseous mixture such as hydrocarbon and steam is passed into contact with the anode and undergoes a reaction under the influence of the dehydrogenation catalyst and current to produce hydrogen ions and carbon dioxide. The hydrogen ions pass from the catalyst through the electrolyte to the cathode palladium membrane where they accept electrons to form atomic hydrogen. The atomic hydrogen then permeates through the membrane and in the manifold at the outlet side of the membrane is formed into molecular hydrogen which is now substantially pure.

Giner also discloses that the anode of his converter may be formed by coating a conductive metal screen with a suitable dehydrogenation catalyst and treating the screen with a hydrophobic material. In this regard, Giner states that other structures may be employed for fabricating the anode, including metal elements inherently permeable to gases such as the porous electrode structure disclosed in Bacon U.S. Pat. No. 2,928,783 and that the metal may be inherently catalytic such as palladium and platinum.

The converter described by Giner relies upon the permeation of atomic hydrogen through a palladium cathode membrane in order to effect hydrogen purification. This makes the cell sensitive to temperature variations and impurity levels, as well as requiring a large differential pressure across the palladium membrane for operation. Furthermore, Giner acknowledges that part of the hydrogen will be evolved on the cathode face of the palladium membrane. This will result in hydrogen loss and seal leaks. Also, the palladium membrane has a high hydrogen over voltage which makes it prone to large power consumption. Finally, the stability of the membrane in an acid media and under the required operating temperature and repeated cycling is also questionable. The Giner converter thus is disadvantageous in a number of respects.

It is therefore an object of the present invention to provide an apparatus and method for purifying hydrogen which do not suffer from the above disadvantages.

It is a further object of the present invention to provide a hydrogen purification apparatus and method which can provide an output gas pressure which is approximately equal to or greater than the input gas pressure.

It is yet a further object of the present invention to provide a hydrogen purification apparatus and method which are highly stable and which provide increased output capacity.

SUMMARY OF THE INVENTION

In accordance with the principles of the present invention, the above and other objectives are realized through the use of a hydrogen purification apparatus comprising an assembly which includes: an anode gas diffusion electrode, a cathode gas diffusion electrode, first and second gas passages adjacent the anode and cathode electrodes, respectively; an acid electrolyte sandwiched between the electrodes; and means for applying a voltage across the electrodes.

As used herein, the term "gas diffusion electrode" means an electrode having macroscopic pores sufficient to permit the passage of molecular hydrogen. Electrodes meeting this requirement have pores approximately equal to or greater than one micron.

With the above configuration for the purification apparatus, impure or dilute hydrogen supplied to the first gas passage of the assembly is converted via the anode gas diffusion electrode, the electrolyte and the cathode gas diffusion electrode to molecular hydrogen which passes through the cathode electrode and into the second gas passage as substantially pure hydrogen. Since the hydrogen passes through the cathode electrode in molecular form, the disadvantages attendant passage in atomic form experienced by the Giner converter are substantially eliminated. Furthermore, since the gas diffusion electrodes are highly stable in the acid electrolyte, the apparatus exhibits good stability.

In a further aspect of the invention, a plurality of assemblies are arranged in stack form and a common input manifold supplies impure hydrogen to all the first passages and a common first output manifold extracts substantially pure hydrogen from all the second passages. In this case, the first passages feed a second common output manifold which receives the gases remaining after extraction of the hydrogen.

In yet a further aspect of the invention, the pure hydrogen is extracted at increased pressure by including the stack within a pressure vessel.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
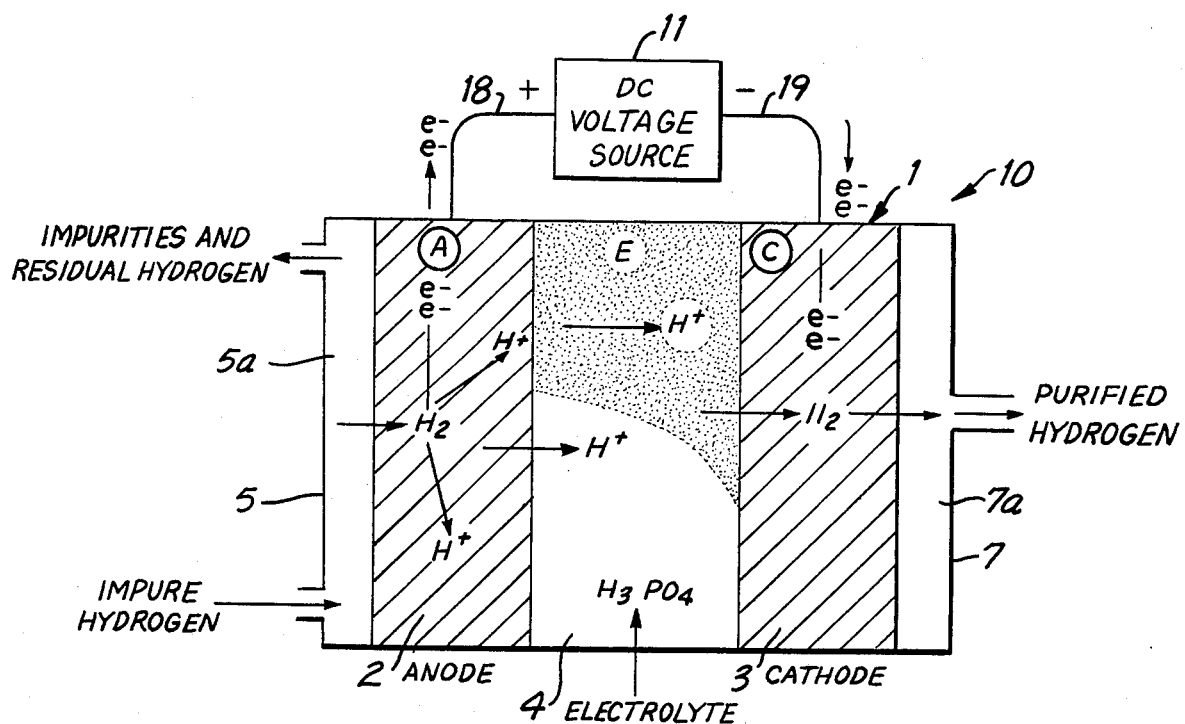
FIG. 1 shows in sectional form an apparatus for purifying hydrogen in accordance with the principles of the present invention.

FIG. 1 shows an apparatus 10 including an assembly 1 for purifying hydrogen gas in accordance with the principles of the present invention. The assembly 1 comprises an anode electrode 2 and a cathode electrode 3 which sandwich an electrolyte 4. A plate 7 abuts the cathode electrode 3 and defines a gas passage 7a for receiving hydrogen purified by the assembly 1. A furtherplate 5 abuts the anode electrode 2 and defines a gas passage 5a for introducing an impure hydrogen stream or feed into the assembly 1.

The apparatus 1 further comprises a DC voltage source, shown as source 11, supplying a voltage across the anode and cathode electrodes 2 and 3. Lead 18 connects the positive terminal of source 11 to the anode electrode 2 and lead 19 connects the negative terminal of the source to the cathode electrode 3.

The electrolyte 4 between the electrodes 2 and 3 may be an acid electrolyte contained within a microporous separator or membrane. The acid electrolyte is preferably phosphoric acid because of its stability at elevated temperatures, although other acid electrolytes such as, for example, sulfuric acid, may also be used. The separator holding the acid electrolyte must be made of an electrical insulator which is stable in the operating environment. Silicon carbide mixed with Teflon as a binder has been found stable for use in hot phosphoric acid and is a preferred material. The electrolyte 4 may also be provided by a solid polymer type electrolyte such as a solid polymer hydrogen ion exchange membrane.

In accordance with the invention, the anode and cathode electrodes 2 and 3 are formed as gas diffusion electrodes having catalytic surfaces. Such electrodes may generally comprise a porous, conductive layer or substrate such as, for example, a layer of porous carbon, which has been catalyzed with a small amount of a metallic catalyst, such as, for example, metallic platinum. Typically, the electrodes should have a porosity of between 50 to 90 percent and a metallic catalyst content of between 0.05 to 0.5 mg/cm$^2$.

The assembly 1 provides purification of the impure or dilute hydrogen stream fed to the passage 5a by selective electrochemical action which separates the hydrogen from the other gases in the stream and delivers it to the passage 7a. This selective electrochemical action is based upon highly reversible hydrogen oxidation-reduction reactions. In particular, equations I and II below govern the reactions at the anode and cathode electrodes, respectively.

$$\text{Anode } H_2(g) \rightarrow 2H^+ + 2e^- \qquad [I]$$

$$\text{Cathode } 2H^+ + 2e^- \rightarrow H_2(g) \qquad [II]$$

More specifically, at the anode electrode, the hydrogen in the impure stream difuses through the electrode and is brought in contact with the metallic catalyst which is partially wetted by the acid electrolyte. There is thereby established the three phase interface required for the hydrogen oxidation reaction (conversion of molecular hydrogen to hydrogen ions). In the presence of the applied electrical current, this reaction takes place and the hydrogen is ionized and absorbed into the electrolyte according to equation I.

The hydrogen ions in solution are then transported under the influence of the applied electric field to the cathode electrode 3. At the cathode surface, the hydrogen ions are reduced by the electrons supplied from the external circuit to produce molecular hydrogen in accordance with equation II. This molecular hydrogen then diffuses through the pores of the cathode and enters the passage 7a for delivery from the assembly 1.

Only a small electrical potential need be supplied by the source 11 in order for the hydrogen redox reaction to take place at a substantial rate. Since the diluent or impurity gases normally present in the impure hydrogen stream are not able to undergo a redox reaction at such a low applied potential, the assembly 1 is highly selective to the transfer of hydrogen. The resultant molecular hydrogen produced at the cathode electrode 3 and delivered to the passage 7a thus is of very high purity.

Figure 2:
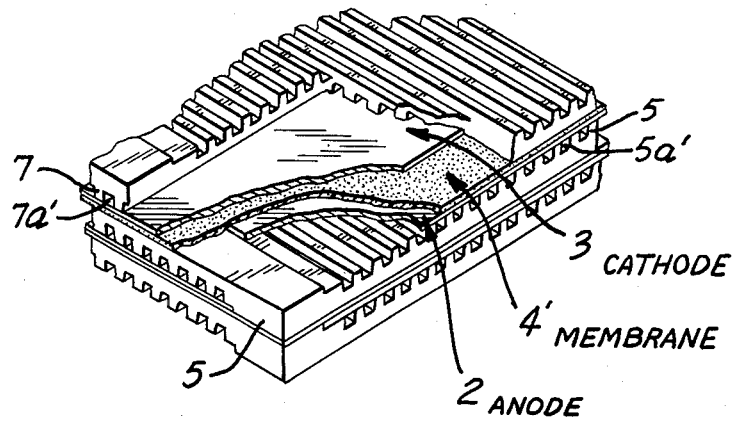
FIG. 2 illustrates a partially cut-away view of an assembly usable for the apparatus of FIG. 1.

It should be noted that the amount of electrical energy expended in the assembly 1 in order to produce a given amount of purified hydrogen depends to a large extent on the electrical resistance exhibited by the assembly. This fact favors the use of thin, large area components for the assembly. To this end, FIG. 2 shows the assembly 1 formed from grooved contact plates for the plates 5 and 7. These plates support thin porous anode and cathode electrodes 2 and 3 between which is sandwiched a thin porous membrane 4' filled with electrolyte.

In the case shown in FIG. 2, the passage 5a in the plate 5 comprises channels 5a' whose input and output ends are open. The open input ends of the channels receive the impure hydrogen gas and the open output ends exhaust the impure gases and any hydrogen gas not transferred to the passage 7a by the assembly. The passage 7a, in turn, comprises channels 7a' which are transverse to the channels 5a'. The channels 7a' are closed at one end and are open at their other end for delivery of the purified hydrogen from the assembly 1.

Figure 3:
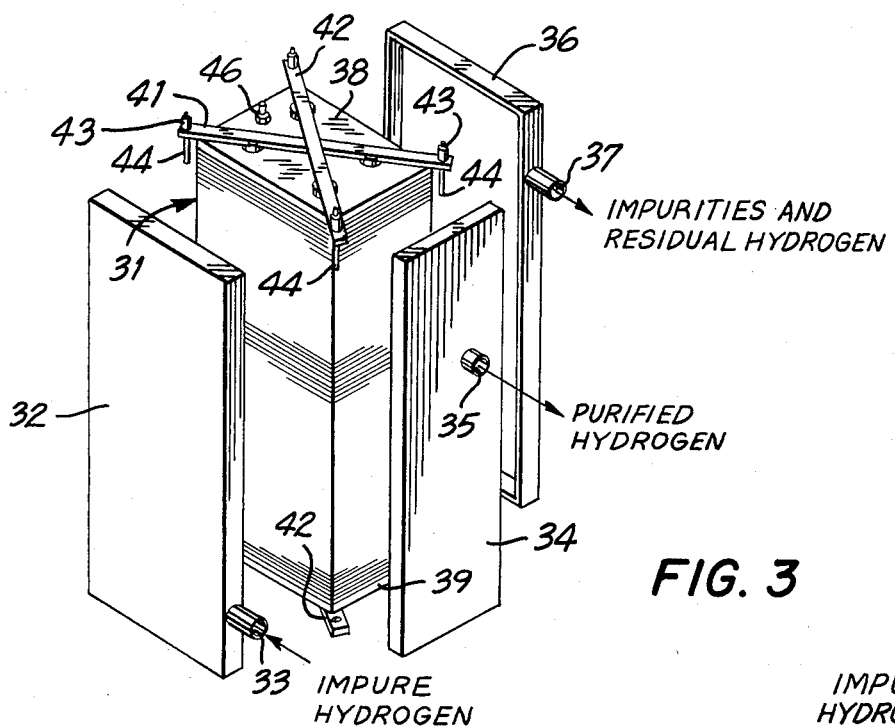
FIG. 3 illustrates the assembly of FIG. 2 arranged with like assemblies to form a stack.

As can be appreciated and as shown in FIGS. 2 and 3, the plates 5 and 7, electrodes 2 and 3 and electrolyte membrane 4' can be repeated to form a stack of assemblies 31. In the case shown, a single plate functions as the plate 5 of one assembly and the plate 7 of the next successive assembly via the transverse sets of channels 5a' and 7a' in its upper and low surfaces.

In such a stack of assemblies, a common input manifold 32 receives the impure hydrogen from an inlet port 33 and delivers it to the input ends of the channels 5a' of assemblies. Purified hydrogen, in turn, exits the assemblies via the open ends of the channels 7a' and is collected in a common output manifold 34 having an outlet port 35. A second common output manifold 36 receives the impurities and the non-transferred hydrogen and these gases exit the manifold via its outlet port 37.

In the stack shown in FIG. 3, the assemblies 1 are compressed between top and bottom flat compression plates 38 and 39. The plates 38 and 39 are, in turn, secured by cross members 41, 42 which are held together by bolts 43 and tie-rods 44. The cross members are supported by pads 45 on the plates 38 and 39. Terminals 46 and 47 (not shown) enable application of the voltage source potential across the assemblies of the stack.

In a further aspect of the invention, the purified hydrogen gas provided by the assembly 1 may be pressurized at a pressure higher than that of the impure hydrogen feed stream. This can be accomplished by placing the assembly in a pressure vessel and collecting the purified hydrogen gas at the higher pressure.

Figure 4:
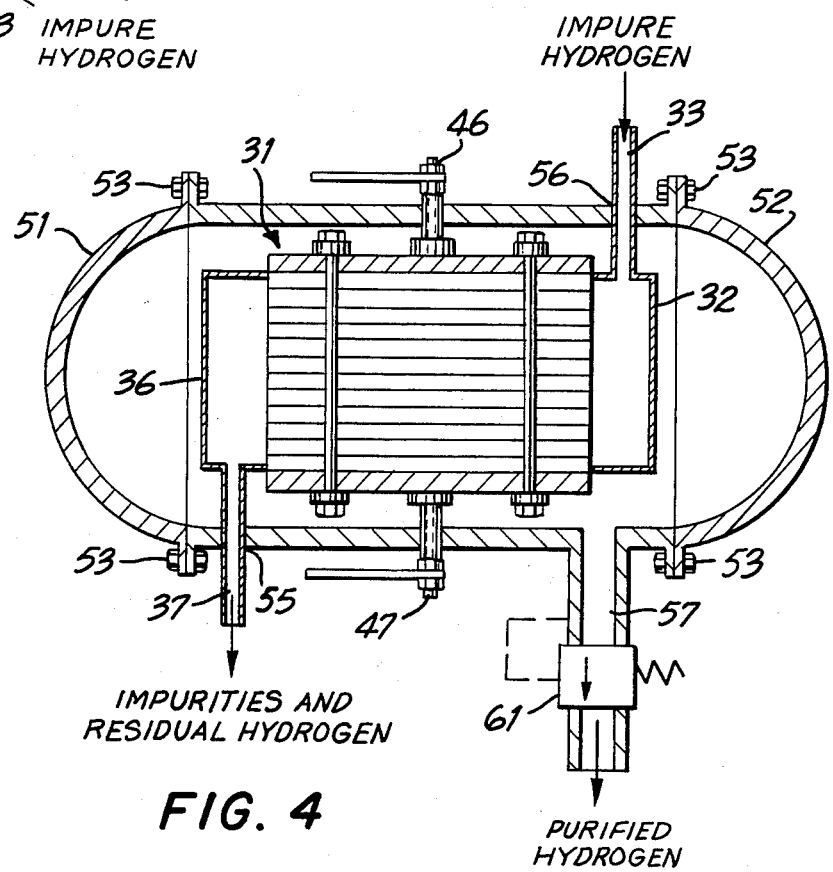
FIG. 4 shows the stack of FIG. 3 arranged in a pressure vessel.

FIG. 4 shows the stack of FIG. 3 disposed in such a pressure vessel formed from bell shaped ended sections 51 and 52 connected by screws 53 to a main body section 54. Openings 55 and 56 in the section 54 allow for passage of the ports 37 and 33 of the manifolds 32 and 36 of the stack 31. The manifold 34 of the stack as shown in FIG. 3 has been removed and the purified hydrogen is allowed to directly enter the interior of the vessel and be collected there.

A pressure regulator 61 is disposed in an outlet port 57 of the vessel. The regulator 61 controls the pressure of the purified hydrogen leaving the vessel and can be set at the pressure desired for the purified gas.

The pressure to which the purified gas can be raised is dependent upon the ability of the electrolyte in each of the assemblies 1 to be retained between the assembly electrodes. Where highest pressures are desired, solid polymer electrolytes should be used. Where, however, liquid electrolytes such as sulfuric or phosphoric acid are to be used, the above mentioned silicon carbide membrane augmented with a layer of ultrafine carbon particles can be used. In this case, the ultrafine carbon layer provides a membrane structure with a very small pore diameter and, as a result, the structure affords strong retention of the electrolyte via capillary forces.

With the present invention, purified hydrogen can be produced at a pressure higher than the pressure of the impure feed stream solely at the expense of the energy required for reversible compression of the hydrogen. The amount of energy required for reversible separation of n pound moles of hydrogen at a temperature T is given by the expression:

$$W = (2.3 \, RT) n \, \log 10 \, (P_2/P_1) \quad [III]$$

where $P_2$ and $P_1$ are delivery and feed pressures, respectively, and R is the gas constant. Reversible work for separating hydrogen from a feed gas containing 20% hydrogen at a temperature of 150° C. can be calculated from equation III and is given below for impure hydrogen and purified hydrogen pressure of 1 and 20 atmospheres.

| Impure Hydrogen (20 Percent) Pressure (Atm) | Purified Hydrogen Pressure (Atm) | Reversible Work $10^3 \times$ Btu/lb-mol. |
|---|---|---|
| 1 | 1 | 2.43 |
| 1 | 20 | 6.96 |
| 20 | 20 | 2.43 |
| 20 | 1 | −4.53 |

Using the above table, the energy needed for reversible compression of hydrogen gas from 1 to 20 atmospheres is determined to be $4.53 \times 10^3$ Btu/lb-mol. With the assembly 1, therefore, only that amount of energy would be required to provide purified gas at 20 atmospheres rather than at 1 atmosphere.

Figure 5:
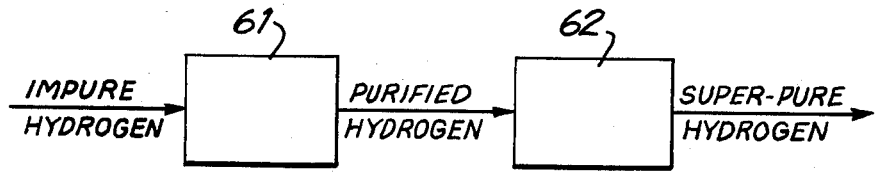
FIG. 5 illustrates a serial arrangement of apparatuses like the apparatus of FIG. 1.

As can be appreciated, a plurality of assemblies like the assembly 1 can be placed in series to produce an ultrapure hydrogen product. FIG. 5 illustrates a preferred tandem arrangement of assemblies in which the first assembly 61 in the series utilizes phosphoric acid as the electrolyte and the second assembly 62 utilizes a solid polymer electrolyte. With this arrangement, most of the unwanted impurities in the hydrogen stream including carbon monoxide, are removed or separated from the hydrogen in the first assembly 61. The second assembly 62, operating on an essentially carbon monoxide free stream, can then deliver an ultrapure hydrogen gas at elevated pressure.

The energy requirements for operating the assembly 1 of FIG. 1 are determined by the irreversible losses resulting from the electrical resistances of the plates 5 and 7, electrodes 2 and 3, the electrolyte membrane and the contact resistances. These energy losses appear as heat in the assembly and serve to raise its operating temperature. The latter temperature, in turn, depends upon the impure feed gas temperature and the current density employed. Typically, it is preferred to operate the assembly at temperatures in a range from 100°–250° C. when phosphoric acid is used as the electrolyte. By operating the assembly at current densities in the range of 200–600 Ma/cm$^2$, the aforesaid operating temperature range can be obtained without the use of separate heating and/or cooling equipment.

The diluents or impurities in the impure hydrogen feed stream, diffuse through the anode electrode, electrolyte membrane and cathode electrode of the assembly 1 in their normal gaseous state at a low but finite rate. By increasing the thickness of the electrolyte membrane and collecting the hydrogen gas at elevated pressures, the diffusion of the unwanted impurities can be decreased. However, increasing the membrane thickness increases its electrical resistance and thereby the energy requirements for operating the assembly. Increasing purity in this manner must, therefore, be weighed against any accompanying increased energy requirements.

As is known, carbon monoxide is one of the common impurities found in conventionally produced dilute hydrogen. Where platinum is used as the catalyst for the electrodes 2 and 3, carbon monoxide can poison the platinum catalyst by adsorbing on the active metal sites if the electrode temperature is too low. Therefore, when appreciable concentrations of carbon monoxide are present in the gas to be purified by the assembly 1, any significant catalyst poisoning can be eliminated by maintaining the operating temperature of the cell above 190° C.

Figure 6:
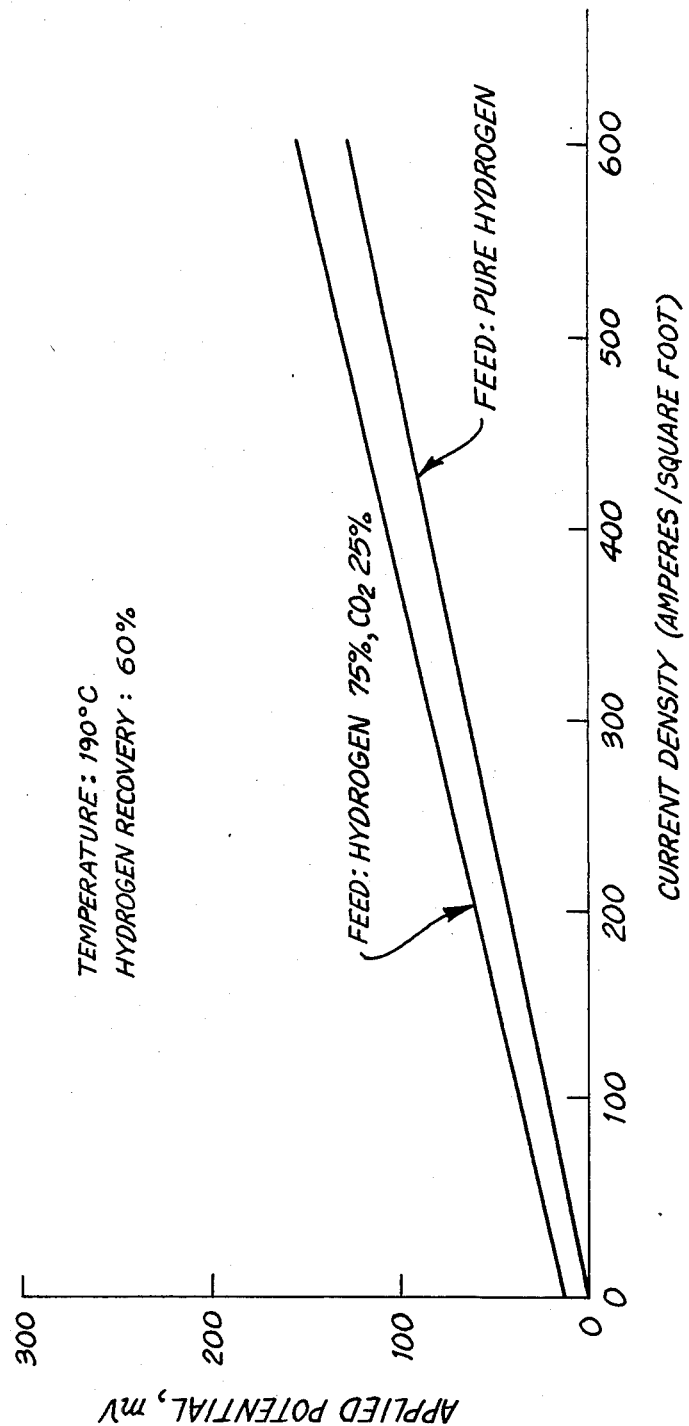
FIG. 6 depicts representative current voltage characteristics of the apparatus of FIG. 1.

FIG. 6 shows current-voltage characteristics of the assembly 1 of FIG. 2 utilizing an electrolyte membrane having an area of 25-cm$^2$ (0.027 square feet). The characteristics are for two different impure hydrogen feed stream compositions. As can be seen from these characteristics, a higher battery potential needs to be applied with a lower hydrogen feed concentration to overcome concentration effects and diffusion losses.

Figures 7, 8:
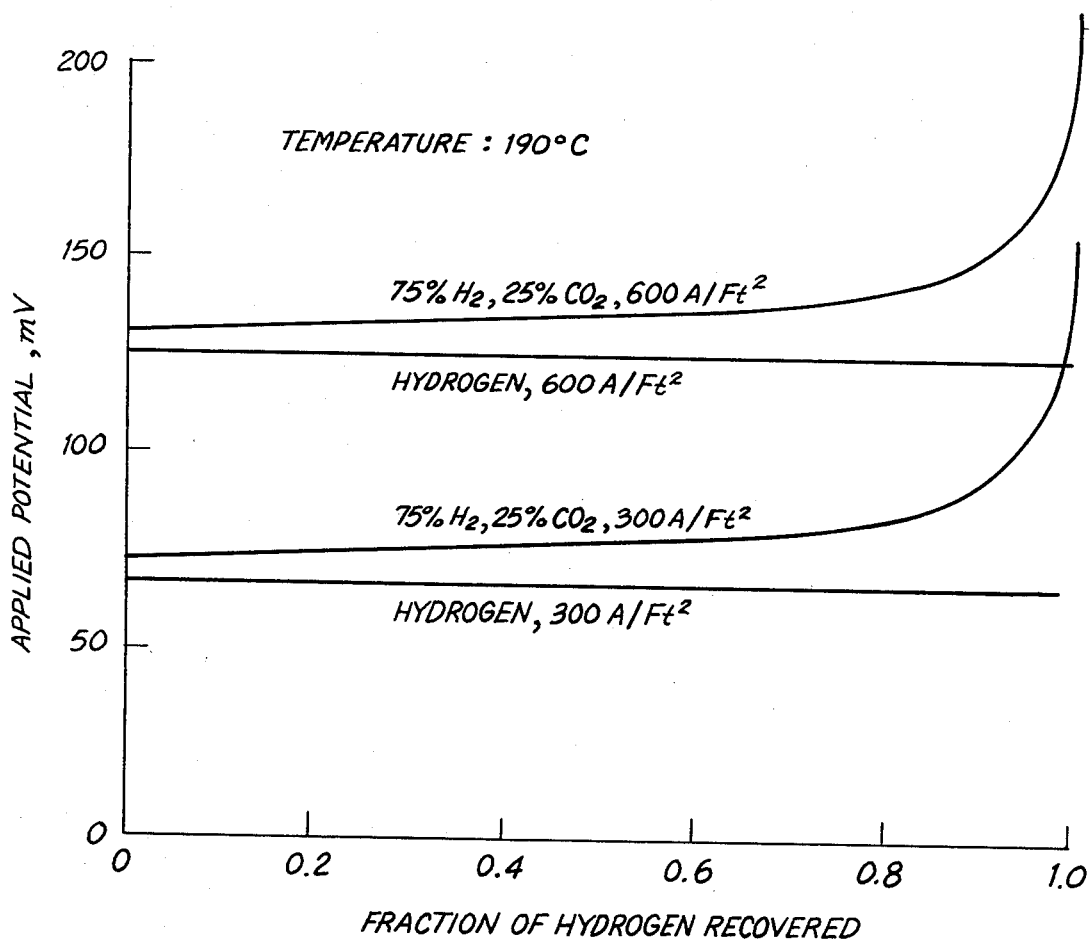
FIG. 7 shows the relationship between the voltage applied to the apparatus of FIG. 1 and the fraction of hydrogen converted to pure hydrogen.
FIG. 8 depicts a table giving the results of a gas chromatograph of the impure feed gas and purified gas of the apparatus of FIG. 1.

The effect of the fraction of hydrogen removed from the impure feed stream on the electrical potential which needs to be applied to the assembly 1 is shown by the graphs in FIG. 7. As can be seen, the potential remains essentially constant until well over 90% of the hydrogen in the feed stream is removed.

Because of the high transfer rate of the hydrogen ion as compared to the much slower diffusion of the gaseous unwanted components through the assembly 1, a high degree of separation occurs even in a single stage device. Table 1 in FIG. 8 shows the results of product hydrogen analysis by gas chromatograph obtained for a 25-cm$^2$ single cell operating at 600 Ma/cm$^2$.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. An apparatus comprising:
   a plurality of assemblies each including:
   a gas diffusion anode electrode;
   a first plate adjacent said anode electrode, said first plate having first passages for carrying a hydrogen containing medium to said anode electrode, each of said first passages of said first plate having open input and output ends;
   a gas diffusion cathode electrode;
   a second plate adjacent said cathode electrode, said second plate having second passages each of which having an open output end;
   and said anode and cathode electrodes being adapted to receive an electrolyte therebetween;
   said assemblies being arranged in a stack with the open input and open ends of the first passages of the assemblies being in respective alignment and the open output ends of the second passages of the assemblies being in alignment;
   means for applying a voltage across the anode and cathode electrodes of each of said assemblies, whereby the hydrogen content in the medium in the first passages of each of said plurality of assemblies is transferred via said anode electrode, electrolyte and said cathode electrode of that assembly to said second passages of said assembly with an increased purity;
   a first input manifold common to the input ends of the first passages of said assemblies for delivering said hydrogen containing medium to said input ends of said first passages;
   a first output manifold common to the output ends of the second passages of said assemblies for receiving from said output ends of said second passages said increased purity hydrogen content;
   and a second output manifold common to the output ends of the first passages for receiving from said output ends of said first passages gas exhausted from said first passages.

2. An apparatus in accordance with claim 1 further comprising:
   means for maintaining said hydrogen in said first output manifold at a pressure greater than the pressure of said hydrogen containing medium.

3. Apparatus in accordance with claim 1 wherein:
   the ends of said second passages of said assemblies opposite the open output ends of said second passages of said assemblies are closed.

4. Apparatus in accordance with claim 1 wherein:
   said first passages of said plurality of assemblies all run in a direction substantially parallel to a first direction;
   and said second passages of said plurality of assemblies all run in a direction substantially parallel to a second direction, said second direction being transverse to said first direction.

5. Apparatus in accordance with claim 1 wherein:
   said gas diffusion anode and cathode electrodes comprise a metal catalyst.

6. Apparatus in accordance with claim 5 wherein:
   said catalyst is platinum.

7. Apparatus in accordance with claim 1 wherein:
   said electrolyte is an acid electrolyte.

8. Apparatus in accordance with claim 7 wherein:
   said acid is phosphoric acid.

9. Apparatus in accordance with claim 1 further comprising:
   a microporous membrane situated between said electrodes, said membrane containing said electrolyte.

10. Apparatus in accordance with claim 1 wherein:
    said electrolyte is a solid polymer electrolyte.

11. Apparatus in accordance with claim 2 wherein:
    said first output manifold comprises a vessel;
    and said pressure maintaining means comprises a pressure regulator.

12. Apparatus in accordance with claim 11 further comprising:
    a further plurality of said assemblies;
    said further plurality of assemblies being arranged in a further stack with the open input and open output ends of the first passages of the further assemblies being in respective alignment and the open output ends of the second passages of the further assemblies being in alignment;
    further means for applying a voltage across the anode and cathode electrodes of each of said further assemblies, whereby the hydrogen content in the medium in the first passages of each of said further plurality of assemblies is transferred via said anode electrode, electrolyte and said cathode electrode of that further assembly to said second passage of said further assembly with an increased purity;
    a further first input manifold common to the input ends of the first passages of said further assemblies for delivering hydrogen containing medium to said input ends of said first passages;
    a further first output manifold common to the output ends of the second passages of said further assemblies for receiving from said output ends of said second passages said increased purity hydrogen content;
    and a further second output manifold common to the output ends of the first passages of said further assemblies for receiving from said output ends of said first passages gas exhausted from said first passages;

and means for coupling the first output manifold to the further first input manifold.

13. Apparatus in accordance with claim 12 wherein:

each of said assemblies further comprises a microporous membrane situated between the anode and cathode electrodes of that assembly and a phosphoric acid contained in said microporous membrane;

and each of said further assemblies includes an electrolyte a solid polymer electrolyte situated between the anode and cathode electrodes of that assembly.

* * * * *